US012681805B2

(12) United States Patent
Heath et al.

(10) Patent No.: US 12,681,805 B2
(45) Date of Patent: Jul. 14, 2026

(54) RECOVERY MODE FOR MEMORY DEVICE

(71) Applicant: Micron Technology, Inc., Boise, ID (US)

(72) Inventors: Nicholas T. Heath, Pittsboro, NC (US); Gaurav Sinha, Unterschleißheim (DE)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/002,408

(22) Filed: Dec. 26, 2024

(65) Prior Publication Data

US 2025/0238327 A1     Jul. 24, 2025

Related U.S. Application Data

(60) Provisional application No. 63/624,571, filed on Jan. 24, 2024.

(51) Int. Cl.
*G06F 11/14*     (2026.01)
*G06F 11/07*     (2006.01)

(52) U.S. Cl.
CPC ........ *G06F 11/1417* (2013.01); *G06F 11/073* (2013.01); *G06F 11/0793* (2013.01)

(58) Field of Classification Search
CPC .. G06F 11/073; G06F 11/079; G06F 11/0793; G06F 11/1417; G06F 11/1441
See application file for complete search history.

(56) References Cited

U.S. PATENT DOCUMENTS

| | | | | |
|---|---|---|---|---|
| 8,706,955 B2* | 4/2014 | Fai | | G06F 12/0246 |
| | | | | 711/E12.008 |
| 10,942,800 B2* | 3/2021 | Yun | | G06F 11/0727 |
| 11,481,153 B2* | 10/2022 | Cho | | G06F 3/0634 |
| 2023/0325275 A1* | 10/2023 | Golvalkar | | G06F 11/0751 |
| | | | | 714/764 |

* cited by examiner

*Primary Examiner* — Joseph R Kudirka
(74) *Attorney, Agent, or Firm* — Harrity & Harrity, LLP

(57)     ABSTRACT

Implementations described herein relate to implementing a recovery mode for a memory device. In some implementations, the memory device may include memory and one or more components. The one or more components may be configured to receive, from a host system, an indication that the memory device is associated with a failure. The one or more components may be configured to receive, from the host system, a request to initialize a recovery of the memory device in response to the failure. The one or more components may be configured to initialize, based on the request, a reboot of the memory device. The one or more components may be configured to transmit, to the host system, status information obtained while rebooting the memory device, wherein the status information includes information associated with a current operational state of the memory device.

20 Claims, 4 Drawing Sheets

200 ⟶

200

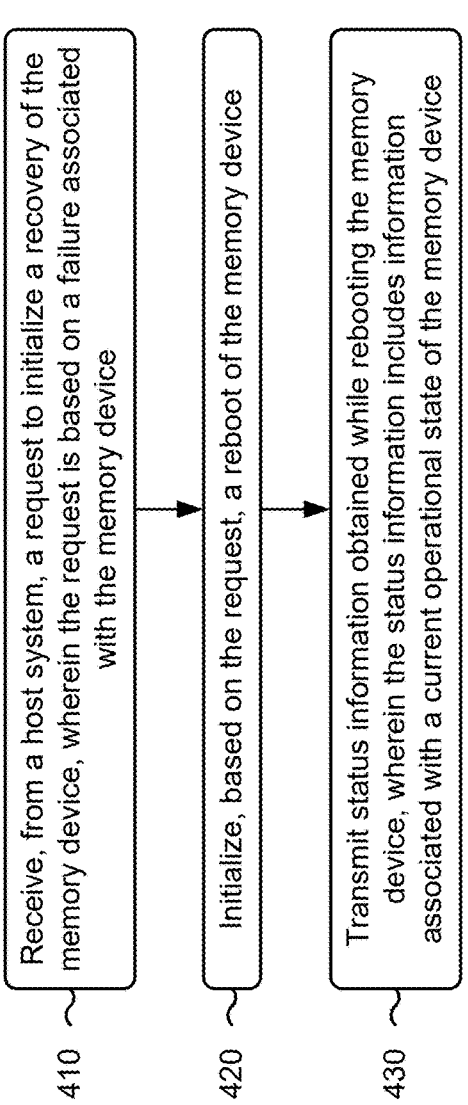

Receive, from a host system, a request to initialize a recovery of the memory device, wherein the request is based on a failure associated with the memory device

410

Initialize, based on the request, a reboot of the memory device

420

Transmit status information obtained while rebooting the memory device, wherein the status information includes information associated with a current operational state of the memory device

RECOVERY MODE FOR MEMORY DEVICE

CROSS REFERENCE TO RELATED APPLICATION

This Patent Application claims priority to U.S. Provisional Patent Application No. 63/624,571, filed on Jan. 24, 2024, and entitled "RECOVERY MODE FOR MEMORY DEVICE." The disclosure of the prior Application is considered part of and is incorporated by reference into this Patent Application.

TECHNICAL FIELD

The present disclosure generally relates to memory devices, memory device operations, and, for example, to recovery modes for memory devices.

BACKGROUND

A non-volatile memory device, such as a NAND memory device, may use circuitry to enable electrically programming, erasing, and storing of data even when a power source is not supplied. Non-volatile memory devices may be used in various types of electronic devices, such as computers, mobile phones, or automobile computing systems, among other examples.

A non-volatile memory device may include an array of memory cells, a page buffer, and a column decoder. In addition, the non-volatile memory device may include a control logic unit (e.g., a controller), a row decoder, or an address buffer, among other examples. The memory cell array may include memory cell strings connected to bit lines, which are extended in a column direction.

A memory cell, which may be referred to as a "cell" or a "data cell," of a non-volatile memory device may include a current path formed between a source and a drain on a semiconductor substrate. The memory cell may further include a floating gate and a control gate formed between insulating layers on the semiconductor substrate. A programming operation (sometimes called a write operation) of the memory cell is generally accomplished by grounding the source and the drain areas of the memory cell and the semiconductor substrate of a bulk area, and applying a high positive voltage, which may be referred to as a "program voltage," a "programming power voltage," or "VPP," to a control gate to generate Fowler-Nordheim tunneling (referred to as "F-N tunneling") between a floating gate and the semiconductor substrate. When F-N tunneling is occurring, electrons of the bulk area are accumulated on the floating gate by an electric field of VPP applied to the control gate to increase a threshold voltage of the memory cell.

An erasing operation of the memory cell is concurrently performed in units of sectors sharing the bulk area (referred to as "blocks"), by applying a high negative voltage, which may be referred to as an "erase voltage" or "Vera," to the control gate and a configured voltage to the bulk area to generate the F-N tunneling. In this case, electrons accumulated on the floating gate are discharged into the source area, so that the memory cells have an erasing threshold voltage distribution.

Each memory cell string may have a plurality of floating gate type memory cells serially connected to each other. Access lines (sometimes called "word lines") are extended in a row direction, and a control gate of each memory cell is connected to a corresponding access line. A non-volatile memory device may include a plurality of page buffers connected between the bit lines and the column decoder. The column decoder is connected between the page buffer and data lines.

BRIEF DESCRIPTION OF THE DRAWINGS

FIG. 4 is a flowchart of an example method associated with implementing a recovery mode for a memory device.

DETAILED DESCRIPTION

Figure 1:
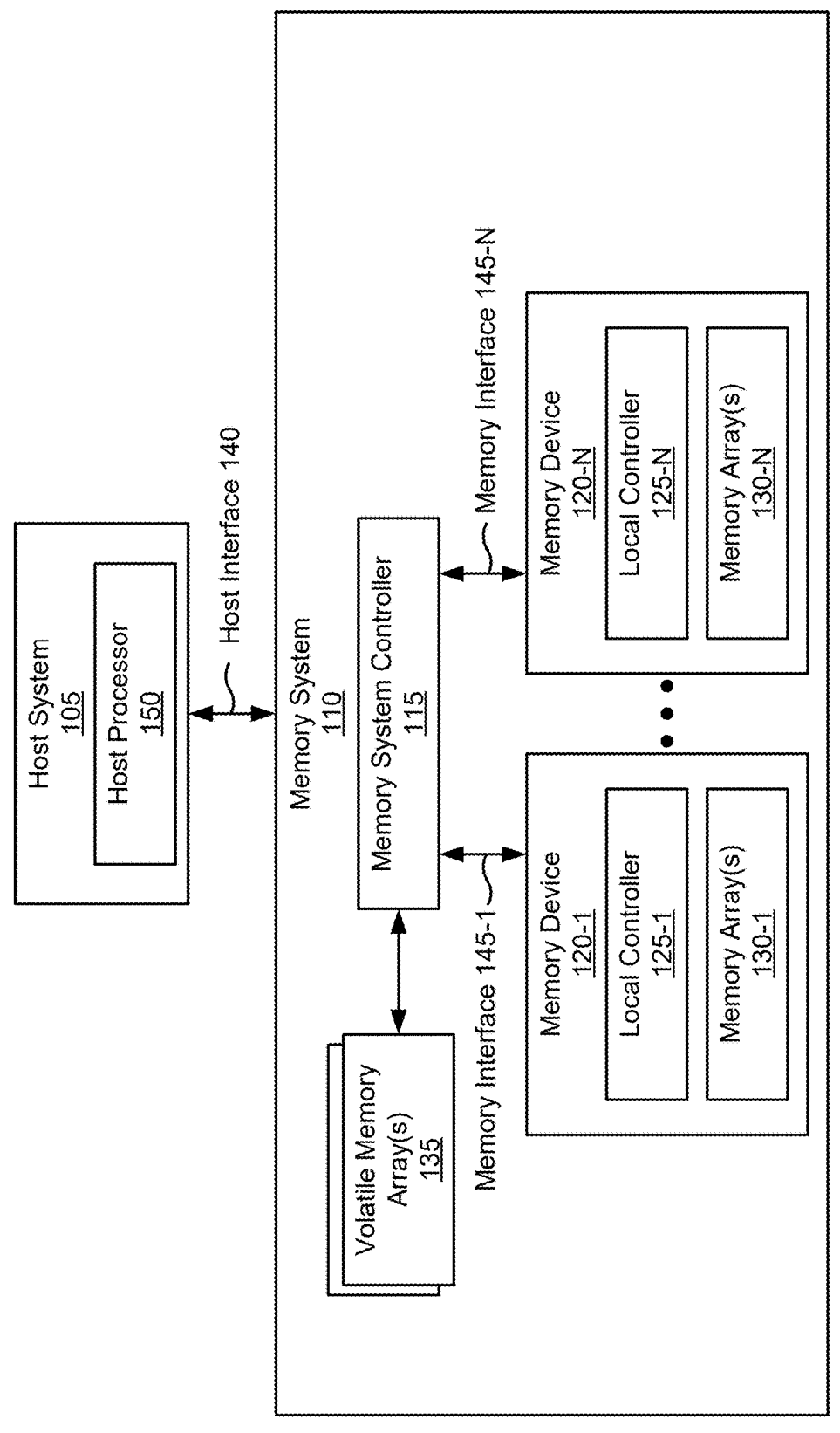
FIG. 1 is a diagram illustrating an example system capable of implementing a recovery mode for memory devices.

A memory device, such as a non-volatile memory (NVM) solid-state drive (SSD) associated with a vehicle, may receive commands from a host system to read data from the memory device and/or write data to the memory device. In some cases, the memory device may experience a failure. The failure may cause the memory device to be unable to receive and/or process the commands. The failure may cause the memory device to no longer communicate with the host system.

As an example, an SSD may fail to boot in a host system, which may occur when the SSD has a successful Peripheral Component Interconnect Express (PCIe) link up but an NVM subsystem initialization fails. A failure to boot in the host system may cause unpredictable host behavior, as the host system may try and fail to interrogate the SSD. As another example, an embedded or automotive SSD, which may be in a ball grid array (BGA) form factor, may encounter a failure in which SSD firmware is no longer able to communicate with the host system. Critical automotive SSD failures may be due to loss of communication with the host system (e.g., the memory device may no longer be functional or may otherwise be unresponsive).

When the memory device is associated with the failure (e.g., the memory device is not responding to the host system), the host system may waste resources and/or power in trying to communicate with the memory device that is unresponsive. The memory device may also waste power because the memory device may be powered on but may be unable to perform any functions.

When the memory device is associated with the failure, the host system associated with the memory device may be recalled to a service center as no action may be taken in the field. When the host system and the memory device are associated with the vehicle, the entire vehicle may be recalled to the service center, which may cause frustration to an end customer (e.g., a vehicle owner). At the service center, a printed circuit board (PCB) with the SSD is often replaced as a whole and then sent for further analysis since the SSD is often a BGA and soldered down on the PCB, which may result in a relatively costly replacement due to numerous other components on the PCB. A further analysis process may require a destruction of a host PCB and further physical preparation before the SSD is able to be powered down, which may enable the reuse of the host PCB by either a manufacturer or the customer.

In some implementations described herein, a memory device may receive, from a host system, an indication that the memory device is associated with a failure. The failure may be associated with an inability of the host processor to read data from the memory device or write data to the memory device. The failure may be associated with a bootup of the memory device, where the host processor may be unable to interrogate the memory device based on the failure. The memory device and the host system may be associated with a vehicle. The memory device may receive, from the host system, a request to initialize a recovery boot mode in response to the failure. The recovery boot mode may provide one or more registers and one or more interfaces that are usable by the memory device and the host processor to assist in a recovery of the memory device. The recovery boot mode may be based on a vendor specific PCIe recovery boot capability of the memory device. The memory device may initialize, based on the request, the recovery boot mode. The memory device may initialize the recovery boot mode using backup firmware (e.g., recovery firmware). The memory device may transmit, to the host system, status information obtained while operating in the recovery boot mode.

In some implementations, by enabling the host system to restart the memory device with the backup firmware, the host system may be able to resolve the failure associated with the memory device. For example, the host system may be able to resume communication with the memory device after restarting the memory device with the backup firmware, thereby preventing the host system and/or the memory device from unnecessarily wasting power due to the memory device being unresponsive. By instructing the memory device to initialize the boot recovery mode, the memory device may be able to resolve the failure and resume normal operations without wasting computing resources and/or power, which may improve an overall performance of the host system and the memory device.

In some implementations, the recovery boot mode may produce debug information. Even when the vehicle still needs to visit the service center for recovery of the memory device, the debug information may be extracted from the memory device and used to recover the memory device. The usage of the debug information may eliminate the need to remove a PCB with the memory device from the vehicle and destroy the entire PCB (e.g., destroy the memory device). In cases in which the PCB is removed from the vehicle, the PCB may not need to be physically destroyed and data may be pulled from the memory device and sent for further analysis. The usage of the debug information may decrease a triage response time as data may be immediately available, and there may be less delay due to physical preparation of the PCB with the memory device.

In some implementations, an ability for the memory device to execute the boot recovery mode in the field may allow the memory device to be recovered and triaged, as well as reduce the occurrence of having to physically send the memory device to the service center for analysis. When the memory device is sent to the service center, such an approach may often require physical destruction of the PCB (e.g., a customer application PCB) due a BGA form factor. The ability to execute the boot recovery mode in the field may allow valuable debug information to be retrieved in system with the PCB. The ability to execute the boot recovery mode in the field may allow for a better response by an end customer's application, which may react to backup firmware information and better inform a customer on handling certain situations in the case of vehicle failure. Otherwise, when the memory device in the vehicle becomes unresponsive in the field, an entire subsystem may fail and the vehicle may need to be towed to the service center. Further, a capability to recover the memory device with a backup firmware image may reduce the specialized hardware and software normally required to recover unresponsive memory devices in development and customer qualification processes.

FIG. 1 is a diagram illustrating an example system 100 capable of implementing a recovery mode for memory devices. The system 100 may include one or more devices, apparatuses, and/or components for performing operations described herein. For example, the system 100 may include a host system 105 and a memory system 110. The memory system 110 may include a memory system controller 115 and one or more memory devices 120, shown as memory devices 120-1 through 120-N (where N≥1). A memory device may include a local controller 125 and one or more memory arrays 130. The host system 105 may communicate with the memory system 110 (e.g., the memory system controller 115 of the memory system 110) via a host interface 140. The memory system controller 115 and the memory devices 120 may communicate via respective memory interfaces 145, shown as memory interfaces 145-1 through 145-N (where N≥1).

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host system 105 may include a host processor 150. The host processor 150 may include one or more processors configured to execute instructions and store data in the memory system 110. For example, the host processor 150 may include a central processing unit (CPU), a graphics processing unit (GPU), a field-programmable gate array (FPGA), an application-specific integrated circuit (ASIC), and/or another type of processing component.

The memory system 110 may be any electronic device or apparatus configured to store data in memory. For example, the memory system 110 may be a hard drive, an SSD, a flash memory system (e.g., a NAND flash memory system or a NOR flash memory system), a universal serial bus (USB) drive, a memory card (e.g., a secure digital (SD) card), a secondary storage device, a non-volatile memory express (NVMe) device, an embedded multimedia card (eMMC) device, a dual in-line memory module (DIMM), and/or a random-access memory (RAM) device, such as a dynamic RAM (DRAM) device or a static RAM (SRAM) device.

The memory system controller 115 may be any device configured to control operations of the memory system 110 and/or operations of the memory devices 120. For example, the memory system controller 115 may include control logic, a memory controller, a system controller, an ASIC, an FPGA, a processor, a microcontroller, and/or one or more processing components. In some implementations, the memory system controller 115 may communicate with the host system 105 and may instruct one or more memory devices 120 regarding memory operations to be performed by those one or more memory devices 120 based on one or more instructions from the host system 105. For example, the memory system controller 115 may provide instructions to a local controller 125 regarding memory operations to be performed by the local controller 125 in connection with a corresponding memory device 120.

A memory device 120 may include a local controller 125 and one or more memory arrays 130. In some implementations, a memory device 120 includes a single memory array 130. In some implementations, each memory device 120 of the memory system 110 may be implemented in a separate semiconductor package or on a separate die that includes a respective local controller 125 and a respective memory array 130 of that memory device 120. The memory system 110 may include multiple memory devices 120.

A local controller 125 may be any device configured to control memory operations of a memory device 120 within which the local controller 125 is included (e.g., and not to control memory operations of other memory devices 120). For example, the local controller 125 may include control logic, a memory controller, a system controller, an ASIC, an FPGA, a processor, a microcontroller, and/or one or more processing components. In some implementations, the local controller 125 may communicate with the memory system controller 115 and may control operations performed on a memory array 130 coupled with the local controller 125 based on one or more instructions from the memory system controller 115. As an example, the memory system controller 115 may be an SSD controller, and the local controller 125 may be a NAND controller.

A memory array 130 may include an array of memory cells configured to store data. For example, a memory array 130 may include a non-volatile memory array (e.g., a NAND memory array or a NOR memory array) or a volatile memory array (e.g., an SRAM array or a DRAM array). In some implementations, the memory system 110 may include one or more volatile memory arrays 135. A volatile memory array 135 may include an SRAM array and/or a DRAM array, among other examples. The one or more volatile memory arrays 135 may be included in the memory system controller 115, in one or more memory devices 120, and/or in both the memory system controller 115 and one or more memory devices 120. In some implementations, the memory system 110 may include both non-volatile memory capable of maintaining stored data after the memory system 110 is powered off and volatile memory (e.g., a volatile memory array 135) that requires power to maintain stored data and that loses stored data after the memory system 110 is powered off. For example, a volatile memory array 135 may cache data read from or to be written to non-volatile memory, and/or may cache instructions to be executed by a controller of the memory system 110.

The host interface 140 enables communication between the host system 105 (e.g., the host processor 150) and the memory system 110 (e.g., the memory system controller 115). The host interface 140 may include, for example, a Small Computer System Interface (SCSI), a Serial-Attached SCSI (SAS), a Serial Advanced Technology Attachment (SATA) interface, a PCIe interface, an NVMe interface, a USB interface, a Universal Flash Storage (UFS) interface, an eMMC interface, a double data rate (DDR) interface, and/or a DIMM interface.

The memory interface 145 enables communication between the memory system 110 and the memory device 120. The memory interface 145 may include a non-volatile memory interface (e.g., for communicating with non-volatile memory), such as a NAND interface or a NOR interface. Additionally, or alternatively, the memory interface 145 may include a volatile memory interface (e.g., for communicating with volatile memory), such as a DDR interface.

Although the example memory system 110 described above includes a memory system controller 115, in some implementations, the memory system 110 does not include a memory system controller 115. For example, an external controller (e.g., included in the host system 105) and/or one or more local controllers 125 included in one or more corresponding memory devices 120 may perform the operations described herein as being performed by the memory system controller 115. Furthermore, as used herein, a "controller" may refer to the memory system controller 115, a local controller 125, or an external controller. In some implementations, a set of operations described herein as being performed by a controller may be performed by a single controller. For example, the entire set of operations may be performed by a single memory system controller 115, a single local controller 125, or a single external controller. Alternatively, a set of operations described herein as being performed by a controller may be performed by more than one controller. For example, a first subset of the operations may be performed by the memory system controller 115 and a second subset of the operations may be performed by a local controller 125. Furthermore, the term "memory apparatus" may refer to the memory system 110 or a memory device 120, depending on the context.

A controller (e.g., the memory system controller 115, a local controller 125, or an external controller) may control operations performed on memory (e.g., a memory array 130), such as by executing one or more instructions. For example, the memory system 110 and/or a memory device 120 may store one or more instructions in memory as firmware, and the controller may execute those one or more instructions. Additionally, or alternatively, the controller may receive one or more instructions from the host system 105 and/or from the memory system controller 115, and may execute those one or more instructions. In some implementations, a non-transitory computer-readable medium (e.g., volatile memory and/or non-volatile memory) may store a set of instructions (e.g., one or more instructions or code) for execution by the controller. The controller may execute the set of instructions to perform one or more operations or methods described herein. In some implementations, execution of the set of instructions, by the controller, causes the controller, the memory system 110, and/or a memory device 120 to perform one or more operations or methods described herein. In some implementations, hardwired circuitry is used instead of or in combination with the one or more instructions to perform one or more operations or methods described herein. Additionally, or alternatively, the controller may be configured to perform one or more operations or methods described herein. An instruction is sometimes called a "command."

For example, the controller (e.g., the memory system controller 115, a local controller 125, or an external controller) may transmit signals to and/or receive signals from memory (e.g., one or more memory arrays 130) based on the one or more instructions, such as to transfer data to (e.g., write or program), to transfer data from (e.g., read), to erase, and/or to refresh all or a portion of the memory (e.g., one or more memory cells, pages, sub-blocks, blocks, or planes of the memory). Additionally, or alternatively, the controller may be configured to control access to the memory and/or to provide a translation layer between the host system 105 and the memory (e.g., for mapping logical addresses to physical addresses of a memory array 130). In some implementations, the controller may translate a host interface command (e.g., a command received from the host system 105) into a memory interface command (e.g., a command for performing an operation on a memory array 130).

In some implementations, one or more systems, devices, apparatuses, components, and/or controllers of FIG. 1 may be configured to receive, from the host system 105, an indication that the memory device 120 is associated with a failure; receive, from the host system 105, a request to initialize a recovery boot mode in response to the failure;

initialize, based on the request, the recovery boot mode; and transmit, to the host system 105, status information obtained while operating in the recovery boot mode.

In some implementations, one or more systems, devices, apparatuses, components, and/or controllers of FIG. 1 may be configured to receive a request to initialize a recovery of the memory device 120, wherein the request is based on a failure associated with the memory device 120; initialize, based on the request, a reboot of the memory device 120; and transmit status information obtained while rebooting the memory device 120, wherein the status information includes information associated with a current operational state of the memory device 120.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally, or alternatively, a set of components (e.g., one or more components) shown in FIG. 1 may perform one or more operations described as being performed by another set of components shown in FIG. 1.

Figure 2:
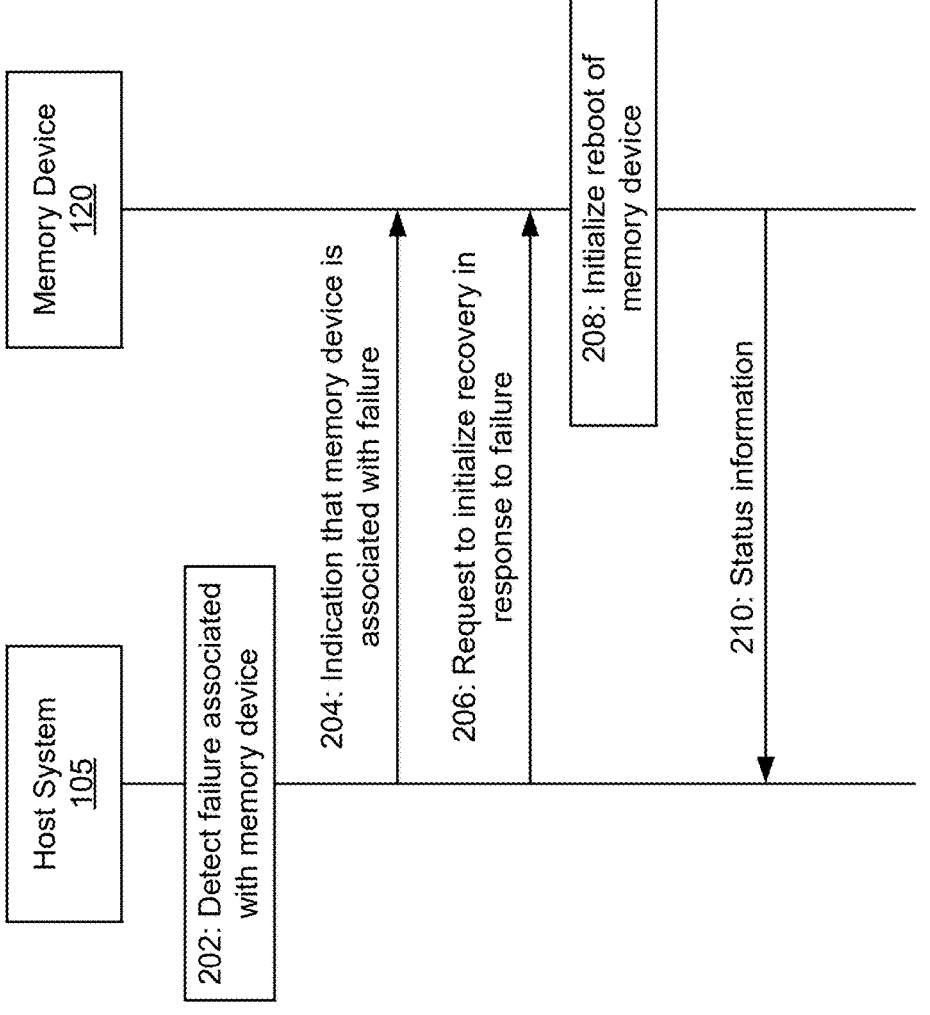
FIG. 2 is a diagram illustrating an example of implementing a recovery mode for memory devices.

FIG. 2 is a diagram illustrating an example 200 of implementing a recovery mode for memory devices. The example 200 may include the host system 105 and the memory device 120. The host system 105 and the memory device 120 may be associated with a vehicle. For example, the memory device 120 may be an automotive SSD.

As shown by reference number 202, the host system 105 may detect a failure associated with the memory device 120. The failure may be associated with an inability of the host system 105 to read data from the memory device 120 and/or write data to the memory device 120. The failure may be associated with a bootup of the memory device 120, where the host system may be unable to interrogate the memory device 120 based on the failure. The host system 105 may detect some error when attempting to perform an operation with the memory device 120, which may be an indication of the failure.

As an example, an SSD may fail to boot in the host system 105, which may occur when the SSD has a successful PCIe link up but an NVM subsystem initialization fails. A failure to boot in the host system 105 may cause unpredictable host behavior, as the host system may try and fail to interrogate the SSD. As another example, an embedded or automotive SSD, which may be in a BGA form factor, may encounter a failure in which SSD firmware is no longer able to communicate with the host system 105. Critical automotive SSD failures may be due to loss of communication with the host system 105 (e.g., the SSD may no longer be functional or may otherwise be unresponsive). In these situations, the host system 105 may be able to detect the failure associated with the SSD.

As shown by reference number 204, the memory device 120 may receive, from the host system 105, an indication that the memory device 120 is associated with the failure. The indication may indicate a type of failure. For example, the indication may indicate that the failure is associated with the inability of the host system 105 to read data from the memory device 120 and/or write data to the memory device 120. As another example, the indication may indicate that the failure is associated with the bootup of the memory device 120. In some cases, the indication may not explicitly indicate the type of failure.

As shown by reference number 206, the memory device 120 may receive, from the host system 105, a request to initialize a recovery of the memory device 120 in response to the failure. For example, the request may be to initialize a recovery boot mode in response to the failure. The host system 105 may request the memory device 120 to initialize the recovery boot mode in order to resolve the failure. The recovery boot mode may enable the memory device 120 to resolve the failure in the field. The recovery boot mode may be based on a vendor specific PCIe recovery boot capability of the memory device 120. In an alternative configuration, the host system 105 may not transmit the indication of the failure to the memory device 120. Rather, the host system 105 may only transmit the request to initialize the recovery boot mode, where the request may be based on the failure detected by the host system 105.

As shown by reference number 208, the memory device 120 may initialize, based on the request, a reboot of the memory device 120. The memory device 120 may initialize the recovery boot mode based on the request. The recovery boot mode may provide one or more registers and/or one or more interfaces, which may be usable by the memory device 120 and/or the host system 105 to assist in a recovery of the memory device 120. The reboot may be associated with the one or more registers and/or the one or more interfaces. The memory device 120 may perform, based on the request, a power cycling of the memory device 120. The memory device 120 may use, after the power cycling, backup firmware stored on the memory device 120 to initialize the recovery boot mode (or reboot). The memory device 120 may receive, from the host system 105 and while operating in the recovery boot mode (or while rebooting the memory device 120), debug firmware. The memory device 120 may perform, while operating in the recovery boot mode (or while rebooting the memory device 120), a debug operation using the debug firmware. The debug operation may produce debug information, which may be useful to resolve the failure. The debug information may indicate various error codes, which may be useful in identifying and resolving the failure.

As shown by reference number 210, the memory device 120 may transmit, to the host system 105, status information obtained while rebooting the memory device 120. The status information may include information associated with a current operational state of the memory device 120. The memory device 120 may transmit the status information while operating in the recovery boot mode. The host system 105 may perform some action based on the status information. For example, when the status information indicates that the recovery boot mode was successful, the host system 105 may resume normal read-write operations with the memory device 120. However, when the status information indicates that the recovery boot mode was not successful, the host system 105 may wait to resume normal read-write operations with the memory device 120.

In some implementations, the host system 105 may indicate, to the memory device 120, that the host system 105 has detected the failure with the memory device 120. The host system 105 may then request that the memory device 120 initialize into the recovery boot mode using the vendor specific PCIe recovery boot capability. The vendor specific PCIe recovery boot capability may provide the one or more registers and/or the one or more interfaces, which the host system 105 and the memory device 120 may use to assist in a recovery boot. The host system 105 may store these capabilities, such that the memory device 120 may always boot into recovery mode until the host system 105 clears the recovery boot mode. The memory device 120 may support the recovery boot mode with the backup firmware. During the recovery boot mode, the memory device 120 may only perform minimal operations, which may ensure that a recovery bootup is possible. For example, the memory device 120 may avoid building mapping tables, and the memory device 120 may limit NAND operations, which may allow the memory device 120 to enter and execute the recovery boot mode. During the boot recovery mode, the memory device 120 may download the debug firmware in an authenticated manner, which may assist in the debug operation.

In some implementations, the memory device 120 itself may have a capability to detect the failure. For example, the memory device 120 may detect when communications with the host system 105 are no longer occurring. In this case, the memory device 120 itself may initialize the recovery boot mode. The memory device 120 may power cycle and start the recovery firmware. When recovery is successful, the memory device 120 may resume normal operations with the host system 105.

In some implementations, by enabling the host system 105 to restart the memory device 120 with the backup firmware, the host system 105 may be able to resolve the failure associated with the memory device 120. For example, the host system 105 may be able to resume communication with the memory device 120 after restarting the memory device 120 with the backup firmware, thereby preventing the host system 105 and/or the memory device 120 from unnecessarily wasting power due to the memory device 120 being unresponsive. By instructing the memory device 120 to initialize the boot recovery mode, the memory device 120 may be able to resolve the failure and resume normal operations without wasting computing resources and/or power, which may improve an overall performance of the host system 105 and the memory device 120.

In some implementations, when the recovery boot mode is unsuccessful in the field and the vehicle needs to be sent to a service center for recovery of the memory device 120, the debug information may be extracted from the memory device 120 and used to recover the memory device 120. The usage of the debug information may eliminate the need to remove a PCB with the memory device 120 from the vehicle and destroy the entire PCB (e.g., destroy the memory device 120). In cases in which the PCB is removed from the vehicle, the PCB may not need to be physically destroyed and data may be pulled from the memory device 120 and sent for further analysis. The usage of the debug information may decrease a triage response time as data may be immediately available, and there may be less delay due to physical preparation of the PCB with the memory device 120. An ability for the memory device 120 to execute the boot recovery mode in the field may allow the memory device 120 to be recovered and triaged, as well as reduce the occurrence of having to physically send the memory device 120 to the service center for analysis. The ability to execute the boot recovery mode in the field may allow valuable debug information to be retrieved in system with the PCB, which may avoid having to physically destroy the PCB.

As indicated above, FIG. 2 is provided as an example. Other examples may differ from what is described with regard to FIG. 2.

Figure 3:
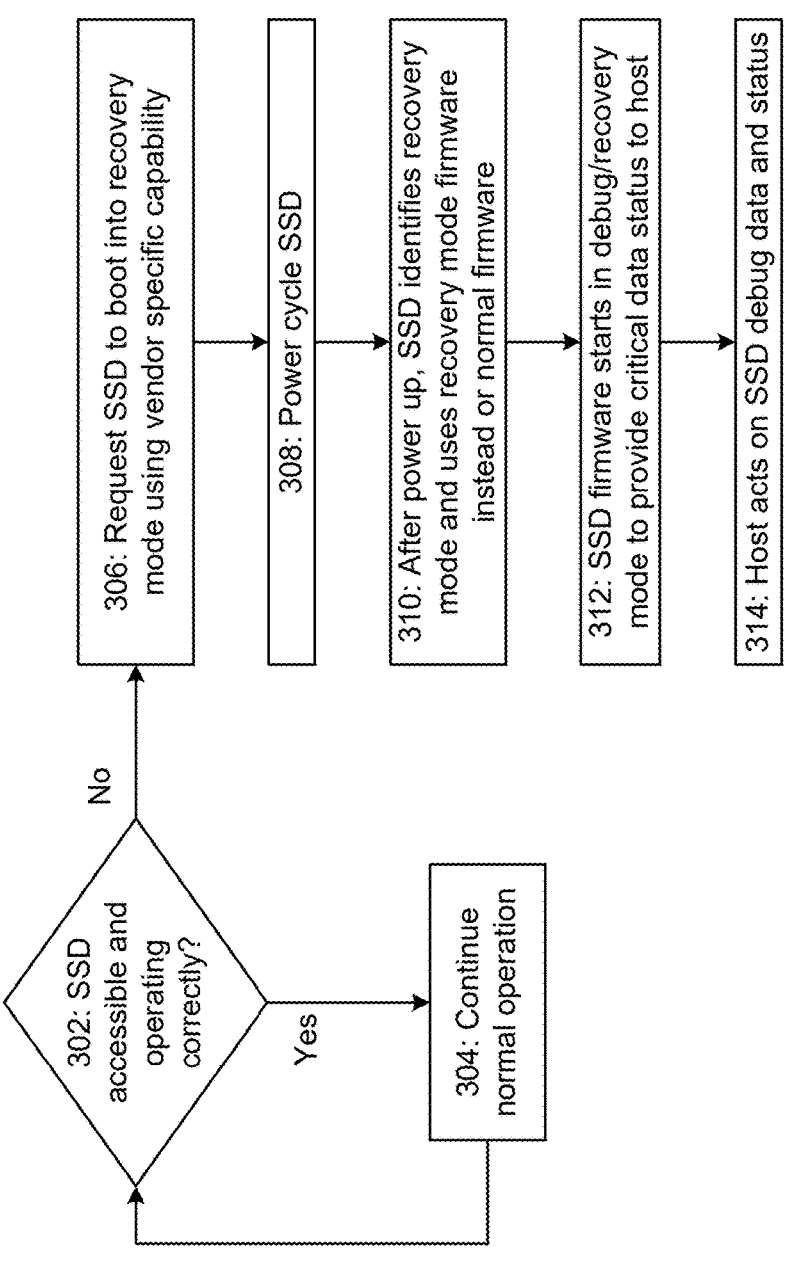
FIG. 3 is a diagram illustrating an example of implementing a recovery mode for memory devices.

FIG. 3 is a diagram illustrating an example 300 of implementing a recovery mode for memory devices.

As shown by reference number 302, a host system (e.g., host system 105) may check whether an SSD (e.g., memory device 120) is accessible and operating correctly. For example, the host system may check whether the host system is able to communicate with the SSD. The SSD may be an embedded automotive SSD. As shown by reference number 304, when the SSD is accessible and operating correctly, the host system and the SSD may continue normal operations. As shown by reference number 306, when the SSD is not accessible and/or not operating correctly, the host system may request that the SSD boot into a recovery mode using a vendor specific capability. The vendor specific capability may be a recovery mode vendor specific PCIe capability, which may allow the SSD to boot up in the recovery mode. As shown by reference number 308, the SSD may perform a power cycle based on the request received from the host system. As shown by reference number 310, after a power up, the SSD may identify the recovery mode and use recovery firmware to boot into the recovery mode. The SSD may use the recovery firmware instead of normal firmware. The recovery firmware may have a limited functionality as compared to the normal firmware. For example, the recovery firmware may avoid building tables and/or may only support limited NAND operations, which may allow for the SSD to enter and run in the recovery mode. The recovery firmware may be executed after the power cycling of the SSD. As shown by reference number 312, during the recovery mode, SSD firmware may start in a debug/recovery mode to provide a critical data status to the host system. As shown by reference number 314, the host system may act on SSD debug data and status information. The host system may perform various actions based on the SSD debug data and status information, which may involve providing the SSD debug data and status information for display on a user interface. After the SSD is recovered and resumes normal operations, the host system may continue to monitor the SSD.

In some implementations, the host system may restart the SSD with the recovery firmware in the field. The recovery firmware may enable the SSD to attempt recovery in the field, which may be useful when the SSD is the embedded automotive SSD. In this case, the SSD may be integrated with a vehicle, and when the SSD is unresponsive, the vehicle may be unusable. Rather than automatically needing to take the vehicle itself to a service center, the host system may attempt to recover the SSD on the field. When recovery on the field is unsuccessful, the vehicle may be taken to the service center.

As indicated above, FIG. 3 is provided as an example. Other examples may differ from what is described with regard to FIG. 3.

FIG. 4 is a flowchart of an example method 400 associated with implementing a recovery mode for a memory device. In some implementations, a memory device (e.g., the memory device 120) may perform or may be configured to perform the method 400. In some implementations, another device or a group of devices separate from or including the memory device (e.g., the system 100) may perform or may be configured to perform the method 400. Additionally, or alternatively, one or more components of the memory device (e.g., the controller 125) may perform or may be configured to perform the method 400. Thus, means for performing the method 400 may include the memory device and/or one or more components of the memory device. Additionally, or alternatively, a non-transitory computer-readable medium may store one or more instructions that, when executed by the memory device (e.g., the controller 125 of the memory device 120), cause the memory device to perform the method 400.

As shown in FIG. 4, the method 400 may include receiving, by a memory device from a host system, a request to initialize a recovery of the memory device, wherein the request is based on a failure associated with the memory device (block 410). As further shown in FIG. 4, the method 400 may include initializing, based on the request, a reboot of the memory device (block 420). As further shown in FIG. 4, the method 400 may include transmitting status information obtained while rebooting the memory device, wherein the status information includes information associated with a current operational state of the memory device (block 430).

The method 400 may include additional aspects, such as any single aspect or any combination of aspects described below and/or described in connection with one or more other methods or operations described elsewhere herein.

In a first aspect, the recovery boot mode provides one or more registers and one or more interfaces that are usable by the memory device and the host system to assist in a recovery of the memory device.

In a second aspect, alone or in combination with the first aspect, the method 400 includes performing, based on the request, a power cycling of the memory device, and using, after the power cycling, backup firmware stored on the memory device to initialize the recovery boot mode.

In a third aspect, alone or in combination with one or more of the first and second aspects, the failure is associated with an inability of the host system to read data from the memory device or write data to the memory device.

In a fourth aspect, alone or in combination with one or more of the first through third aspects, the failure is associated with a bootup of the memory device, and the host system is unable to interrogate the memory device based on the failure.

In a fifth aspect, alone or in combination with one or more of the first through fourth aspects, the method 400 includes receiving, from the host system and while operating in the recovery boot mode, debug firmware, and performing, while operating in the recovery boot mode, a debug operation using the debug firmware.

In a sixth aspect, alone or in combination with one or more of the first through fifth aspects, the recovery boot mode is based on a vendor specific PCIe recovery boot capability of the memory device.

Although FIG. 4 shows example blocks of a method 400, in some implementations, the method 400 may include additional blocks, fewer blocks, different blocks, or differently arranged blocks than those depicted in FIG. 4. Additionally, or alternatively, two or more of the blocks of the method 400 may be performed in parallel. The method 400 is an example of one method that may be performed by one or more devices described herein. These one or more devices may perform or may be configured to perform one or more other methods based on operations described herein.

In some implementations, a memory device includes one or more components configured to: receive, from a host system, an indication that the memory device is associated with a failure; receive, from the host system, a request to initialize a recovery boot mode in response to the failure; initialize, based on the request, the recovery boot mode; and transmit, to the host system, status information obtained while operating in the recovery boot mode.

In some implementations, a method includes receiving, by a memory device from a host system, a request to initialize a recovery of the memory device, wherein the request is based on a failure associated with the memory device; initializing, based on the request, a reboot of the memory device; and transmitting status information obtained while rebooting the memory device, wherein the status information includes information associated with a current operational state of the memory device.

In some implementations, a system includes a host system configured to: detect a failure associated with a memory device, and transmit, to the memory device, a request for the memory device to initialize a recovery of the memory device in response to the failure; and the memory device configured to: receive, from the host system, the request, initialize, based on the request, a reboot of the memory device, and transmit status information obtained while rebooting the memory device, wherein the status information includes information associated with a current operational state of the memory device.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

When "a component" or "one or more components" (or another element, such as "a controller" or "one or more controllers") is described or claimed (within a single claim or across multiple claims) as performing multiple operations or being configured to perform multiple operations, this language is intended to broadly cover a variety of architectures and environments. For example, unless explicitly claimed otherwise (e.g., via the use of "first component" and "second component" or other language that differentiates components in the claims), this language is intended to cover a single component performing or being configured to perform all of the operations, a group of components collectively performing or being configured to perform all of the operations, a first component performing or being configured to perform a first operation and a second component performing or being configured to perform a second operation, or any combination of components performing or being configured to perform the operations. For example, when a claim has the form "one or more components configured to: perform X; perform Y; and perform Z," that claim should be interpreted to mean "one or more components configured to perform X; one or more (possibly different) components configured to perform Y; and one or more (also possibly different) components configured to perform Z."

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:
one or more components configured to:
receive, from a host system, an indication that the memory device is associated with a failure;
receive, from the host system, a request to initialize a recovery of the memory device in response to the failure;
initialize, based on the request, a reboot of the memory device; and
transmit status information obtained while rebooting the memory device, wherein the status information includes information associated with a current operational state of the memory device.

2. The memory device of claim 1, wherein the reboot is associated with one or more registers and one or more interfaces that are usable by the memory device and the host system to assist in a recovery of the memory device.

3. The memory device of claim 1, wherein the one or more components are further configured to:
perform, based on the request, a power cycling of the memory device; and
use, after the power cycling, backup firmware stored on the memory device to initialize the reboot.

4. The memory device of claim 1, wherein the failure is associated with an inability of the host system to read data from the memory device or write data to the memory device.

5. The memory device of claim 1, wherein the failure is associated with a bootup of the memory device, and the host system is unable to interrogate the memory device based on the failure.

6. The memory device of claim 1, wherein the one or more components are further configured to:
receive, from the host system and while rebooting the memory device, debug firmware; and
perform, while rebooting the memory device, a debug operation using the debug firmware.

7. The memory device of claim 1, wherein the reboot is based on a vendor specific Peripheral Component Interconnect Express (PCIe) recovery boot capability of the memory device.

8. The memory device of claim 1, wherein the memory device is associated with a vehicle.

9. A method, comprising:
receiving, by a memory device from a host system, a request to initialize a recovery of the memory device, wherein the request is based on a failure associated with the memory device;

initializing, based on the request, a reboot of the memory device; and
transmitting status information obtained while rebooting the memory device, wherein the status information includes information associated with a current operational state of the memory device.

10. The method of claim 9, wherein the reboot is associated with one or more registers and one or more interfaces that are usable by the memory device and the host system to assist in a recovery of the memory device.

11. The method of claim 9, further comprising:
performing, based on the request, a power cycling of the memory device; and
using, after the power cycling, backup firmware stored on the memory device to initialize the reboot.

12. The method of claim 9, wherein the failure is associated with an inability of the host system to read data from the memory device or write data to the memory device.

13. The method of claim 9, wherein the failure is associated with a bootup of the memory device, and the host system is unable to interrogate the memory device based on the failure.

14. The method of claim 9, further comprising:
receiving, from the host system and while rebooting the memory device, debug firmware; and
performing, while rebooting the memory device, a debug operation using the debug firmware.

15. The method of claim 9, wherein the reboot is based on a vendor specific Peripheral Component Interconnect Express (PCIe) recovery boot capability of the memory device.

16. A system, comprising:
a host system configured to:
detect a failure associated with a memory device, and
transmit, to the memory device, a request for the memory device to initialize a recovery of the memory device in response to the failure; and
the memory device configured to:
receive, from the host system, the request,
initialize, based on the request, a reboot of the memory device, and
transmit status information obtained while rebooting the memory device, wherein the status information includes information associated with a current operational state of the memory device.

17. The system of claim 16, wherein the reboot is associated with one or more registers and one or more interfaces that are usable by the memory device and the host system to assist in a recovery of the memory device, and the reboot is based on a vendor specific Peripheral Component Interconnect Express (PCIe) recovery boot capability of the memory device.

18. The system of claim 16, wherein the memory device is further configured to:
perform, based on the request, a power cycling of the memory device; and
use, after the power cycling, backup firmware stored on the memory device to initialize a recovery boot mode.

19. The system of claim 16, wherein:
the failure is associated with an inability of the host system to read data from the memory device or write data to the memory device; or
the failure is associated with a bootup of the memory device, and the host system is unable to interrogate the memory device based on the failure.

20. The system of claim 16, wherein the memory device is further configured to:

receive, from the host system and while rebooting the memory device, debug firmware; and perform, while rebooting the memory device, a debug operation using the debug firmware.

* * * * *